US005615018A

United States Patent [19]
Wu et al.

[11] Patent Number: 5,615,018
[45] Date of Patent: Mar. 25, 1997

[54] APPARATUS AND A METHOD FOR VARIABLE SPEED SEARCHING OF RECORDED PICTURES

[75] Inventors: Tzong-Sheau Wu, Hsinchu, China; Tian-Rein Chen, Taipei, Taiwan; Rong-Dzung Tsai, Pingtung, China

[73] Assignee: Industrial Technology Research Instiutute, Hsinchu, Taiwan

[21] Appl. No.: 343,677

[22] Filed: Nov. 22, 1994

[51] Int. Cl.$^6$ .................................................. H04N 5/783
[52] U.S. Cl. .................................................. 386/68
[58] Field of Search ...................... 358/312, 335, 358/342, 315; 360/33.1, 72.1, 73.01, 73.06, 27, 10.1; 348/412, 413, 416; H04N 5/783

[56] References Cited

U.S. PATENT DOCUMENTS

| | | | |
|---|---|---|---|
| 4,931,879 | 6/1990 | Koga et al. | 358/335 |
| 5,136,391 | 8/1992 | Minami | 358/312 |
| 5,157,511 | 10/1992 | Kawai et al. | 358/335 |
| 5,191,436 | 3/1993 | Yonemitsu | 358/335 |
| 5,239,429 | 8/1993 | Hoshi | 360/72.1 |
| 5,305,113 | 4/1994 | Iwamura et al. | 358/312 |

OTHER PUBLICATIONS

Draft Revision Of Recommendation H.261: Video Codec For Audiovisual Services At p × 64 kbits/s, pp. 221–239, 1990 Elseview Science Publishers B.V.

*Primary Examiner*—Thai Q. Tran
*Assistant Examiner*—Huy Nguyen
*Attorney, Agent, or Firm*—Meltzer, Lippe, Goldstein, et al.

[57] ABSTRACT

An apparatus and a method for variable speed searching of recorded pictures on a storage medium is disclosed. The apparatus comprises a recording-playback device which records pictures and an information value signal, and plays back the recorded pictures. A speed controller responsive to the information value signal adjusts the speed of the recording-playback device during a fast-scan search (i.e., fast-forward or fast-backward search). The fast-scan search speed is adjusted so that the recorded pictures with high information values are played back at a slower fast-scan speed and the recorded pictures with low information values are played back at a faster fast-scan speed. The information value signal is generated during recording or during playback. The information value signal has a low value when a correlation between temporally successive recorded pictures is high, and a high value when the correlation is low, the correlation depends upon temporal redundancy between the successive video pictures. In short, an apparatus and a method for variable speed searching of recorded pictures is provided in which the fast-scan speed is automatically adjusted to allow for viewing of static and dynamic scenes at a proper speed during a fast-scan search.

11 Claims, 4 Drawing Sheets

APPARATUS AND A METHOD FOR VARIABLE SPEED SEARCHING OF RECORDED PICTURES

FIELD OF THE INVENTION

The present invention is directed to an apparatus for variable speed searching of recorded pictures on a storage medium. In particular, the present invention is directed to controlling the speed of the apparatus during a fast-scan search, based on the correlation of temporally successive recorded pictures.

BACKGROUND OF THE INVENTION

To identify predetermined locations on a storage medium (e.g., a video tape), an operator of conventional recording devices, such as a video cassette recorder (VCR), can record indexes on video tapes. This allows the operator to fast-forward to a particular location on the tape. Conventional VCR's also allow viewing the tape during the fast-forward search to that indexed location.

Conventional fast-forward search devices, such as currently available VCR's, have a constant or user controllable fast-forward search speed. A constant fast-forward search speed is not adequate for viewing recorded video with both static and dynamic scenes ("static and dynamic" scenes are defined below). Similarly, a manually adjustable speed is not an efficient alternative.

A full motion video sequence usually contains both static and dynamic pictures (herein, the term "picture" means either frame or field). Static scenes have little changes between successive pictures. That is, there is a significant amount of picture-to-picture redundancy. For dynamic scenes, the variations between successive pictures is relatively large.

Changes between successive pictures may be measured by motion vectors and non-zero estimation errors. Motion vectors may be used in block matching motion compensation algorithms to remove inter-picture redundancy, for example, in order to achieve a high data compression. Motion may be estimated globally over a whole picture or locally over blocks, e.g., 8×8 two-dimensional arrays of pixels, into which the picture is divided. The best matching position between successive pictures (or blocks) may be determined by minimizing an error function such as is shown in equation (1), $$E = \sum_i \sum_j |a(i,j) - b(i + m_i, j + m_j)|^q \quad (1)$$

where the a(i,j)'s are pixel values of the current picture (or block), the $b(i+m_i, j+m_j)$ are the pixel values of the previous picture (or block), i is a vertical coordinate index, j is a horizontal coordinate index, and $m_i$, $m_j$ represent a displacement vector $D=m_i,m_j$. The power factor q usually equals 1 or 2.

The displacement vector (i.e., values of $m_i$, $m_j$) which minimizes the error function E is called the motion vector. The motion vector represents the minimum shift from the zero displacement vector. For example, for identical pictures, the global motion vector is zero. That is, the successive picture is not shifted from the zero displacement vector of the previous picture. Similarly, for identical successive blocks, the motion vector associated with the particular block is zero.

Static scenes are said to have a relatively low information value because they have relatively little variation (i.e., higher correlation) between successive pictures. Therefore, static scenes have smaller motion vectors or smaller non-zero estimation errors. For static scenes with relatively low motion or variation, estimation of the next scene is relatively accurate. Thus, static scenes have smaller non-zero estimation errors. Of course, for perfectly still scenes, the motion vectors and the estimation errors are zero indicating the next scene is correctly estimated and is identical to the previous scene.

Conversely, dynamic scenes with relatively high variation between scenes (i.e., lower inter-picture correlation) are said to have a higher information value and have larger motion vectors. Estimation of the next scene is usually prone to errors due to the varying scenes.

At a constant fast-forward (or fast-backward) search speed, relatively static scenes, with little variation (i.e., higher correlation) between successive pictures, will appear to be searched at an unreasonably slow speed. Such a search will not appear to be a fast-forward (or fast-backward) search to a viewer. For relatively static scenes, it is desirable to fast-forward search at higher speeds. By contrast, for relatively dynamic scenes, with higher variation (i.e., lower correlation) between successive pictures, the fast-forward search speed will be too fast to be visually recognizable. A slower fast-forward search is desirable for proper viewing. Therefore, a constant search speed cannot properly match the rate of changes in the scenes.

The fast-forward search speed may be manually adjusted. For example, the search speed is decreased for dynamic images, where the user subjectively determines that temporal correlation between successive pictures is low. Conversely, the search speed is increased for static images, where the user subjectively determines that temporal correlation between successive pictures is high.

The manual fast-forward search speed adjustment is not a user friendly technique and requires continuous manual adjustment. In particular, there is a reaction delay between the evaluation of the inter-picture correlation by the user and the manual adjustment of the fast-forward speed. Furthermore, this method is subject to human error which typically occurs when the search speed is fast and a short dynamic scene is scanned which is not detected and therefore overlooked by the user. It is therefore an object of the present invention to overcome the disadvantages of the prior art by automatically varying the fast-forward (or fast-backward) search speed based on the information value of the pictures.

SUMMARY OF THE INVENTION

This and other objects are achieved by the present invention. According to one embodiment of the present invention, an apparatus for variable speed searching of recorded pictures on a storage medium is provided with a variable speed recording-playback device. The recording-playback device records the recorded pictures and an information value signal, and plays back the recorded pictures.

Alternatively, the inventive device does not record the information value. Instead, the inventive device generates the information value signal during a playback or fast-scan search of a pre-recorded storage medium, such as a video tape or a laser disc.

Pictures with a higher temporal correlation between successive (previous or succeeding) pictures have a lower information value. Conversely, pictures with lower inter-picture temporal correlation (i.e., higher rate of change) have a higher information value.

A speed controller responsive to the information value signal adjusts the speed of the recording-playback device during a fast-scan search. The fast-scan search speed is adjusted so that the recorded pictures with higher information values are played back at a slower fast-scan speed. Similarly, the recorded pictures with lower information values are played back at a faster fast-scan speed.

The information value signal has a lower value when the correlation between temporally successive recorded pictures is higher. Similarly, the information value signal has a higher value when the correlation is lower. The correlation depends upon the temporal redundancy between the successive video pictures. Illustratively, the correlation of temporally successive pictures depends from a motion vector which represents the change (e.g., spatial shift) in the successive pictures, a non-zero estimation error or a data size of the successive pictures. The information value signal may be supplied by an operator or a program information extractor. The information value signal may also be supplied by both the operator and the program information extractor.

In another embodiment of the present invention, a method for queuing recorded pictures on a storage medium for variable speed searching is disclosed. An information value signal for each picture in a video signal is generated (before or during recording) and recorded together with the video signal on the storage medium. Instead of generating the information value signal before or during recording of the video signal for example, the information value signal may be generated during playback of the recorded pictures. The search speed of the storage medium is adjusted during a fast-scan search based on the information value signal.

In short, an apparatus and a method for variable speed searching of recorded pictures is provided in which the fast-scan view speed is inversely proportional to the amount of temporal changes between pictures. This allows for viewing of static and dynamic scenes at a proper speed during a fast-scan search. In addition, such a queuing assists in searching, e.g., for high information value pictures.

DETAILED DESCRIPTION OF THE INVENTION

The variable speed searching device of the present invention may be implemented using any recording/playback standard such as the MPEG, NTSC, PAL, MAC, SECAM, etc. standards. The NTSC standard is used in the United States in terrestrial and cable video broadcast and convectional VCRs using non-compressed data. By contrast, the MPEG standard is a newer standard (used in the United States in some direct satellite video broadcasts) wherein data is compressed, motion vectors are generated and successive pictures are estimated and predicted.

MPEG uses temporal DPCM (Differential Pulse Code Modulation) with motion compensation and bi-directional prediction. See "Draft Revision of Recommendation H.261 Video Codec for Audio Visual Services at p×64 Kbits/sec", Signal Processing: Image Communication 2 (1990) 221–239, Elsevier. A basic DPCM technique exploits the fact that much of the area of a picture of video doesn't change from picture to picture. Therefore only an inter-picture difference is transmitted which requires fewer bits than transmitting the entire picture.

Figure 1:
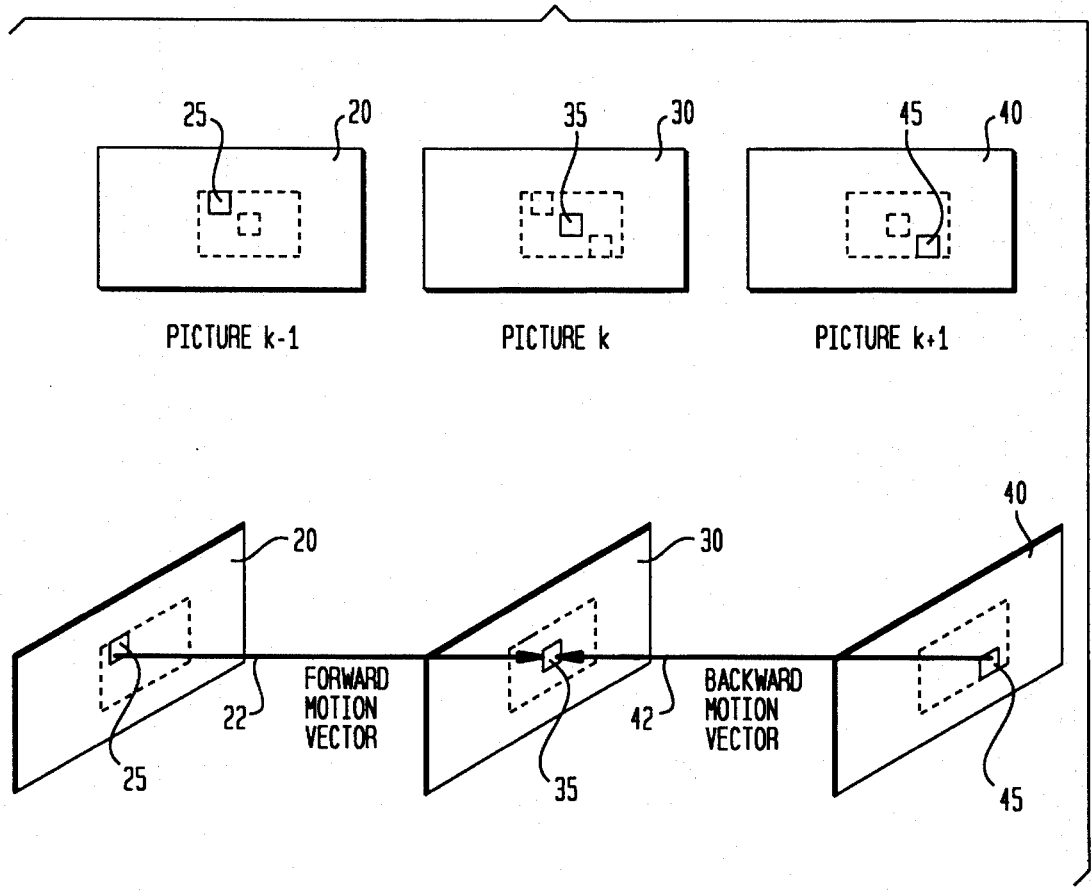
FIG. 1 shows a block matching between successive pictures.

Motion compensation adds considerable additional efficiency to this scheme by exploiting a characteristic of data that merely shifts spatially from picture to picture without further changes. A picture is divided into blocks which may be 8×8 pixels for example. Picture to picture changes are modeled as linear translations on a block by block basis, as shown in FIG. 1. For each block 35 in the current picture k 30, a matching block 25 is found in a previous picture k-1 20. Therefore, only a pointer (motion vector 22, 42) of the matching block plus the difference between the blocks on a pixel by pixel basis is needed to represent the block 35.

The B and P pictures are two types of motion compensated pictures in MPEG. The P-Pictures are motion compensated only by forward (causal) prediction. They themselves may be used for the prediction of future P-Pictures and B-Pictures (bi-directional predicted pictures). MPEG also provides I-Pictures (Intra-Pictures) for which no motion compensation is performed.

Bi-directional prediction is a non-causal process in which motion compensation is performed from a future picture k+1 40 as well as a previous picture k-1 20, as shown in FIG. 1. The bi-directional motion compensation is performed using a forward and a backward motion vectors 22, 42. When a block match is found in both the previous and future pictures 20, 40, the two matched blocks 25, 45 are averaged. This produces a closer match to the current block 35 due to noise averaging. When an object enters or leaves the scene, then only the previous or future block will match with the current block.

Figure 2:
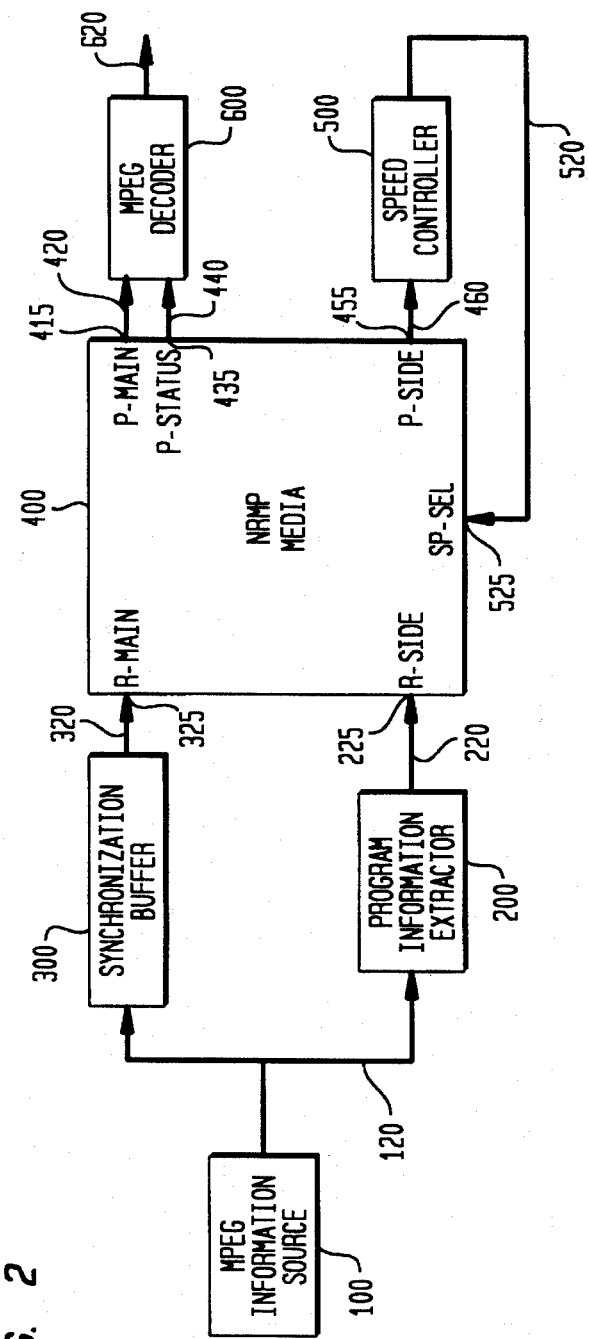
FIG. 2 shows a block diagram of one embodiment of the present invention.
Figure 3:
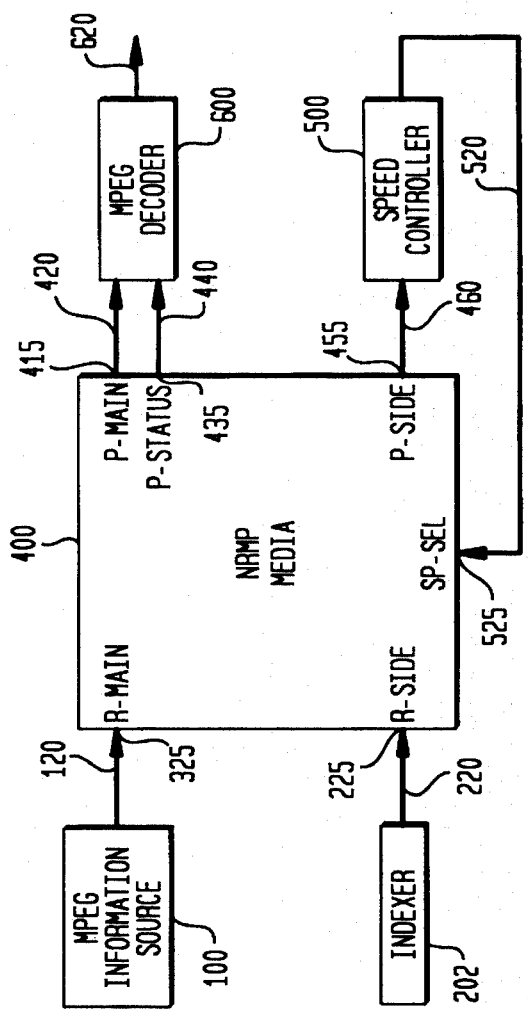
FIG. 3 shows a block diagram of a second embodiment of the present invention.
Figure 4:
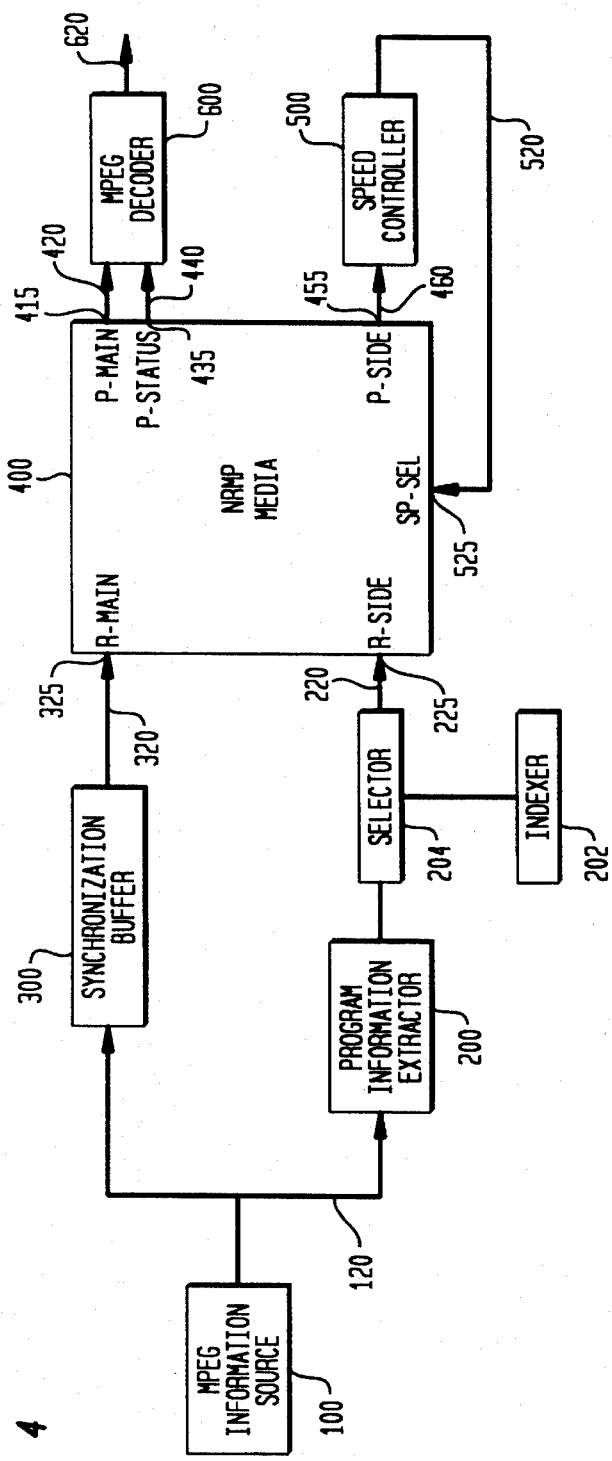
FIG. 4 shows a block diagram of a third embodiment of the present invention.
Figure 5:
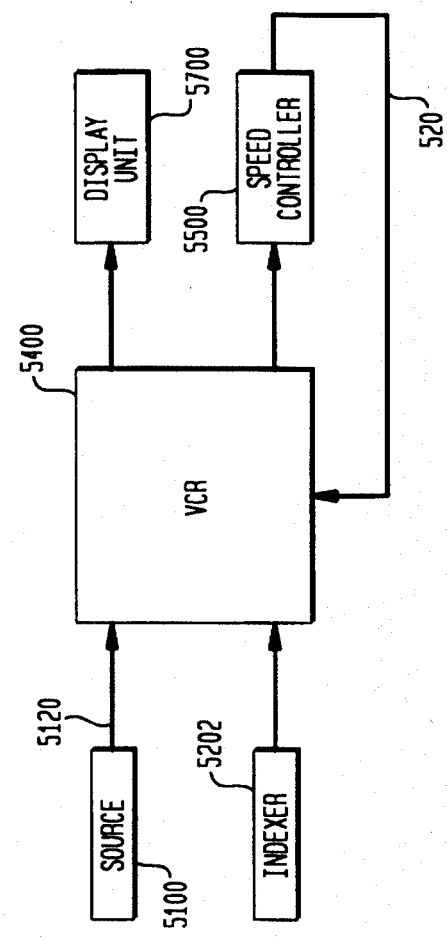
FIG. 5 shows a block diagram of a fourth embodiment of the present invention.

FIGS. 2 to 4 illustrate the present invention used with the MPEG standard. However, the present invention is not confined for use with only the MPEG standard. The present invention may be used with any standard such as the NTSC standard used in conventional VCRs, as shown in FIG. 5.

If the temporally successive pictures are similar, such as in a still or relatively static set of pictures, then the correlation between the successive pictures is higher. That is, relatively static pictures have a lower information value. Conversely, dynamic pictures have a higher information value (i.e., lower correlation between the successive pictures). The information value is quantized and called a QIV (quantized information value). Illustratively, the pictures referred to above, may be an entire picture or blocks of a picture. For example, only successive blocks (i.e., a portions of a picture such as an 8×8 pixel block) of a picture may have relatively dynamic variations while the remaining picture may be relatively static.

Correlation between successive MPEG standard pictures will be used to illustrate the invention since the MPEG standard, which uses data compression techniques, already generates motion vectors. However, different types of grouping of successive scenes or different types of standards may easily be used. For example, a picture may be divided into blocks and block to block correlation used instead of picture to picture correlation. For standards other than MPEG, motion vectors may be first extracted from successive pictures (or blocks) before the quantized information values (QIVs) are determined.

Illustratively, the quantized information value (QIV) or the correlation of temporally successive pictures is proportional to motion vectors (MVQ) and non-zero estimation errors (NZERQ) of MPEG standard B and P pictures as shown in equation (2). The motion vector (MVQ) represents the rate of change in the successive pictures or blocks.

$$QIV=F_1(MVQ, NZERQ) \qquad (2)$$

For example, the motion vector (MVQ) may be the sum of the absolute value of all the motion vectors of each block in a picture. Similarly, the non-zero estimation errors (NZERQ) may be the sum of the absolute value of all the errors of each block in a picture.

Alternatively, the quantized information value (QIV) varies with a data size (DSZ) of the I, B and P pictures. Thus, the quantized information value (QIV) can be represented by the function shown in equations (3).

$$QIV=F_2(DSZ, I\_B\_P) \qquad (3)$$

For example, F2 is merely the accumulation of the I-Pictures, B-Pictures and P-Pictures.

FIG. 2 shows one embodiment of the present invention. A video signal 120, supplied by an information source 100, is inputted into a program information extractor 200 and a synchronization buffer 300. Illustratively, the information source 100 may be a camera or another playback-storage apparatus.

The program information extractor 200 outputs a recording side (R-Side) information signal 220 to an R-Side input 225 of a normal recording multi-speed play (NRMP) media 400. For example, the NRMP media 400 may be a VHS tape recorder apparatus including a VHS video tape. Illustratively, the NRMP media 400 records and plays video tapes such as a video cassette recorder (VCR) or a video tape recorder (VTR). Alternatively, the NRMP media 400 may be a laser disc recorder/player.

The (R-Side) information signal 220 contains the quantized information value (QIV). In the embodiment of the present invention shown in FIG. 2, the program information extractor 200 automatically generates the quantized information values from a correlation of temporally successive pictures in the video signal.

FIG. 3 shows another embodiment of the present invention, wherein the QIVs may be inputted manually through a manual indexer 202 by an operator, such as an editor or a producer. For instance, the operator may add high QIVs at scene changes so that fast-scan searching (i.e., fast-forward or fast-backward searching) is slowed down at the scene changes. FIG. 4 shows yet another embodiment of the present invention, wherein the QIVs may be either inputted manually through the manual indexer 202 by the operator or automatically generated by the program information extractor 200.

Returning to FIG. 2, the program information extractor 120 requires time to calculate the QIV. Therefore, a synchronization buffer 300 synchronizes the pictures contained in the video signal 120 with their associated QIVs contained in the recording side information signal 220. Hence, in addition to supplying the video signal 120 to the program information extractor 120, the MPEG information source 100 also supplies the video signal 120 to the synchronization buffer 300. In turn, the synchronization buffer 300 outputs a recording main information signal 320 to an R-main input 325 of the NRMP media 400, wherein the pictures of the video signal 120 are synchronized with their associated QIVs contained in the recording side information signal 220.

The NRMP media 400, which receives the recording side information signal 220 and the recording main information signal 320, has a variable playback/fast-scan speed. The NRMP media 400 records the scenes along with their associated QIVs. Illustratively, the QIVs may be recorded in time-code areas of a video tape. Alternatively, the NRMP media 400 only records the scenes, and generates the QIVs during a playback or a fast-scan search.

In addition, the NRMP media 400 outputs a playback main information signal (P-Main signal) 420 at a P-Main output 415, a playback status signal (P-Status signal) 440 at a P-Status output 435, and a playback side information signal (P-Side signal) 460 at a P-Side output 460. The P-Side signal 460 contains the QIVs associated with the pictures on the P-Main signal 420. The P-Main signal 420 contains the synchronized pictures to be decoded and displayed with the help of the P-Status signal 440 and an MPEG decoder 600.

The MPEG decoder 600 receives the P-Main signal 420 and the P-Status 440 signal. The decoder 600 decodes the P-Main signal 420 with the help of the P-Status signal 440, which indicates if degradation in data reproduced from the storage media has occurred. Subsequently, the decoder 600 outputs a display signal 620 which, illustratively, can be viewed on a cathode ray tube (CRT) or other display devices (not shown).

A speed controller 500 receives the P-Side signal 460 and outputs a speed select signal 520 back to the NRMP media 400. The NRMP media 400 receives the speed select signal 520 at a SP-SEL input port 525. The speed select signal 520 varies the speed of the NRMP media 400 in order to fast-forward (or fast-backward) search the pictures at a rapid yet visually recognizable speed. That is, recorded relatively dynamic pictures, with higher quantized information values (QIVs), are played back at a slower fast-scan speed, whereas recorded relatively static pictures with lower QIVs are played back at a faster fast-scan speeds.

FIG. 3 shows another embodiment of the present invention operating under the MPEG standard used for illustrative purposes. FIG. 3 shows a similar embodiment to FIG. 2 except that the program information extractor 200 of FIG. 2, which extracts the QIVs, is replaced by an indexer 202. An operator, such as an editor or a producer, manually inputs the QIVs at desired instances.

In response to the manually inputted QIVs by the operator, the indexer 202 outputs the QIVs on the recording side (R-Side) information signal 220 to the R-Side input 225 of the normal recording multi-speed play (NRMP) media 400. The synchronization buffer 300 of FIG. 2 is not needed since the QIVs are not calculated or extracted, but are manually inputted. The rest of the embodiment shown in FIG. 3 is similar to FIG. 2. That is, the video signal 120, supplied by the information source 100, is inputted to the R-Main input 325 of the normal recording multi-speed play (NRMP) media 400.

The NRMP media 400 outputs the P-Main signal 420 and the P-Status signal 440 to the MPEG decoder 600 which decodes the P-Main signal 420 and outputs the display signal 620 which may be viewed on a CRT for example. In addition, the NRMP media 400 outputs the P-Side signal 460 to the speed controller 500 which outputs the speed select signal 520 back to the NRMP media 400. The speed select signal 520 varies the speed of the NRMP media 400 in order to fast-forward (or fast-backward) search the pictures at a rapid yet visually recognizable speed.

FIG. 4 shows yet another embodiment of the present invention which is a combination of the embodiments shown in FIGS. 2 and 3. In the embodiment shown in FIG. 4, the QIVs may be automatically extracted, as in FIG. 2, manually inputted as in FIG. 3 or provided by a combination of automatic extraction and manual inputting.

The program information extractor 200 and the indexer 202 provide the QIVs to a selector 204 which outputs the R-Side information signal 220 to the R-Side input 225 of the normal recording multi-speed play (NRMP) media 400. The selector 204 selects and provides on the R-Side information signal 220 either the QIVs extracted by the program information extractor 200 or the QIVs manually inputted into the indexer 202 by the operator. Alternatively, the selector 204 allows both the extracted QIVs (outputted from the program information extractor 200) and the manually inputted QIVs (outputted from the indexer 202) to appear on the R-Side information signal 220. The rest of the device is similar to the devices shown in FIGS. 2 and 3.

FIG. 5 shows another embodiment of the present invention using a conventional VCR operating under the NTSC standard. FIG. 5 is analogous to FIG. 3, where the QIV are manually inputted by an operator. However, as described above in connection with FIGS. 2 and 4, the QIVs could also be automatically extracted (FIG. 2) or provided by a combination of automatic extraction and manual inputting (FIG. 4). Additional steps may be necessary to extract the QIVs, such as first extracting motion vectors, since unlike the MPEG standard, motion vectors are not generated in the NTSC standard.

In the embodiment depicted in FIG. 5, a source 5100 provides an audio/video signal 5120 and an indexer 5202 provides QIVs to a variable speed VCR 5400 for recording on a media such as a tape. The QIVs are manually inputted by an operator and may be recorded on a control track area or on a time code area of the tape for example. The VCR 5400 plays back the recorded tape and outputs a recorded audio/video signal 5120 to a display unit 5700 for viewing. The VCR 5400 also outputs the recorded QIVs to a speed controller 5500 which outputs a speed select signal 520 back to the VCR 5400.

The speed select signal 520 varies the speed of the VCR 5400 in order to fast-forward (or fast-backward) search the pictures at a rapid yet visually recognizable speed. That is, recorded relatively dynamic pictures, with higher QIVs, are played back at a slower fast-scan speed, whereas recorded relatively static pictures with lower QIVs are played back at a faster fast-scan speeds. For playing back tapes that have pre-recorded indexes, the source 5100 and the indexer 5202 are not used, since they are involved in the recording of tapes and not the playback of prerecorded indexed tapes.

Figure 6:
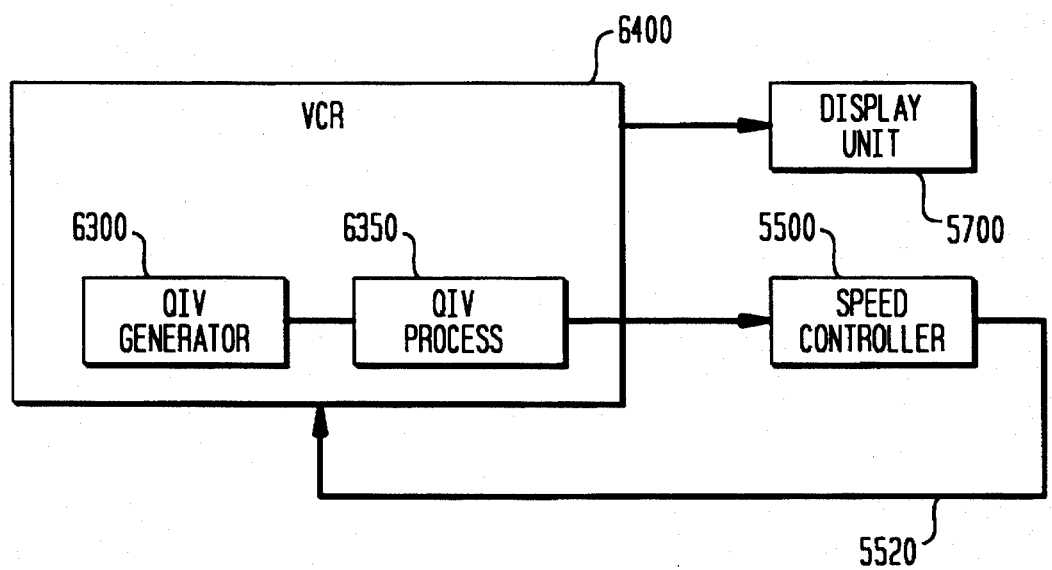
FIG. 6 shows a block diagram of a fifth embodiment of the present invention.

FIG. 6 shows yet another embodiment of the present invention, wherein the QIVs are generated during a playback or a fast search. The QIVs are generated by a QIV generator 6300 internal to the VCR 6400 as the tape is played or fast scanned and displayed on a display unit 5700. The internally generated QIVs are processed by a QIV processor 6350 which outputs a signal to a speed controller 5500. The speed controller 5500 outputs a speed select signal 5520 back to the VCR 6400 which varies the fast scanning speed as discussed above.

Because the speed of the fast-scan search varies depending on the QIVs, the fast-scan search can be efficient, and viewed at a visually recognizable speed. The speed of the fast-scan search increases at relatively static pictures and decreases at relatively dynamic pictures. Hence, the fast-scan search is carried out efficiently at varying speeds.

Therefore, it is no longer necessary to manually adjust or use a constant fast-scan search speed, which is too slow for relatively static pictures and too fast for the relatively dynamic pictures to be recognizable.

Furthermore, the inventive device automatically generates QIVs, allows the user to input a desired QIV, or allows for a combination of automatic and manual QIV generation. Moreover, the inventive device queues the user to important (high QIV) pictures by slowing down the fast search speed for example. In addition, the inventive device may be used with pre-recorded tapes, since it may generate the QIVs during a playback or a fast search. The invention minimizes the fast search time and allows for efficient viewing of fast scans by automatically adjusting fast search speeds.

Finally, the above described embodiment of the invention are intended to be illustrative only. Numerous alternative embodiments may be devised by those skilled in the art without departing form the spirit and scope of the following claims. For example, in other embodiments of the invention, a standard other than MPEG or NTSC, or a storage media other than tapes may be used.

We claim:

1. An apparatus for variable speed searching of recorded pictures on a storage medium, comprising:

a variable speed recording-playback device which records said recorded pictures and an information value signal, and plays back said recorded pictures, wherein said information value signal has a low value when a correlation between temporally successive recorded pictures is high, and a high value when said correlation is low, said correlation depending upon temporal redundancy between said successive video pictures, and a speed controller responsive to said information value signal for adjusting a display speed of said recording-playback device during a fast-scan search in response to said information value signal so as to continuously vary the display speed to display the recorded pictures at a fast display speed when said information value signal has a low value, and to display the recorded pictures at a slower display speed when said information value signal has a high value.

2. The apparatus of claim 1 wherein said information value signal is generated during recording.

3. The apparatus of claim 1 wherein said correlation of temporally successive pictures depends from at least one of a motion vector which represents rate of change in said successive pictures, a non-zero estimation error and a data size of said successive pictures.

4. The apparatus of claim 1 wherein said information value signal is supplied by an operator.

5. The apparatus of claim 1 wherein said information value signal is generated by a program information extractor.

6. An apparatus for variable speed searching of recorded pictures on a storage medium, comprising:

a variable speed recording-playback device which generates an information value signal during playback of said recorded pictures, wherein said information value signal has a low value when a correlation between temporally successive recorded pictures is high, and a high value when said correlation is low, said correlation depending upon temporal redundancy between said successive video pictures, and a speed controller responsive to said information value signal for adjusting a display speed of said recording-playback device during a fast-scan search in response to said information value signal so as to continuously vary the display speed to display the recorded pictures at a fast display speed when said information value signal has a low value, and to display the recorded pictures at a slower display speed when said information value signal has a high value.

7. A method for queuing recorded pictures on a storage medium for variable speed searching comprising the steps of:

generating an information value signal for each picture in a video signal, wherein said information value signal has a low value when a correlation between temporally successive recorded pictures is high, and a high value when said correlation is low, said correlation depending upon temporal redundancy between said successive video pictures, recording said information value signal together with said video signal on said storage medium, and adjusting a display speed of said storage medium during a fast-scan search in response to said information value signal so as to continuously vary the display speed to display the recorded pictures at a fast display speed when said information value signal has a low value, and to display the recorded pictures at a slower display speed when said information value signal has a high value.

8. The method of claim 7 wherein said information value signal is generated by correlating temporally successive pictures in said video signal.

9. The method of claim 8 wherein said correlation is performed using at least one of a motion vector which represents rate of change in said successive pictures, a non-zero estimation error and a data size of said successive pictures.

10. The apparatus of claim 7 wherein said information value signal is generated by an operator.

11. A method of queuing recorded pictures on a storage medium for variable speed searching comprising the steps of:

generating an information value signal for each picture in said recorded pictures during playback of said recorded pictures, wherein said information value signal has a low value when a correlation between temporally successive recorded pictures is high, and a high value when said correlation is low, said correlation depending upon temporal redundancy between said successive video pictures, and adjusting a display speed of said storage medium during a fast-scan search in response to said information value signal so as to continuously vary the display speed to display the recorded pictures at a fast display speed when said information value signal has a low value, and to display the recorded pictures at a slower display speed when said information value signal has a high value.

* * * * *